April 13, 1937.  W. K. COWDERY  2,076,764
METHOD OF MAKING HANDLES
Filed July 30, 1936   2 Sheets-Sheet 1

Warren K. Cowdery,
INVENTOR.
BY *Slough and Panfield*
HIS ATTORNEYS.

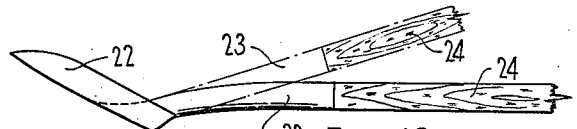
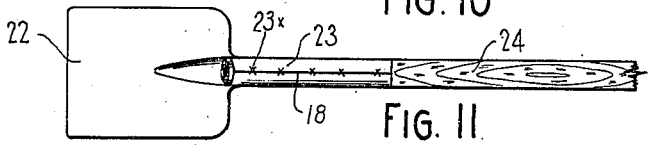
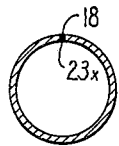
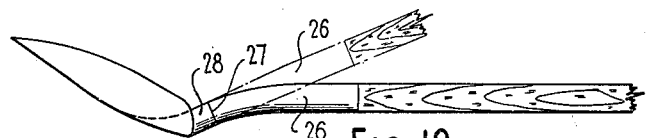
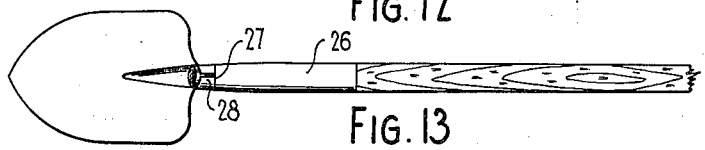
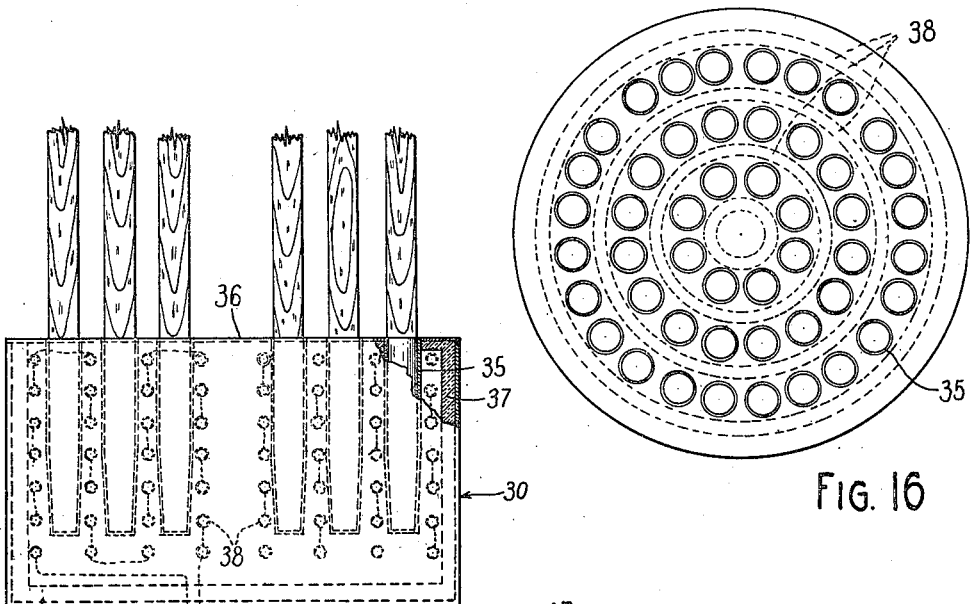
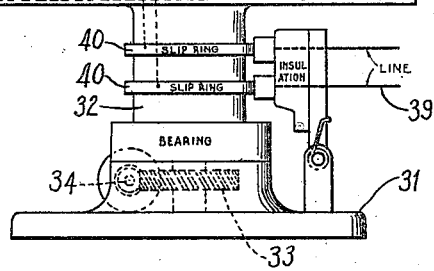

Patented Apr. 13, 1937

2,076,764

UNITED STATES PATENT OFFICE 2,076,764

METHOD OF MAKING HANDLES

Warren K. Cowdery, Ashtabula, Ohio, assignor to The American Fork & Hoe Company, Cleveland, Ohio, a corporation of Ohio Application July 30, 1936, Serial No. 93,402

1 Claim. (Cl. 144—309)

My invention relates to material handling hand implements and method of making the same, and relates more particularly to handles for tools such as shovels, forks and the like.

It is customary to provide tools having wood handles such as shovels, forks and similar implements, used in the agricultural and industrial fields, with stems or tangs generally integrally attached to the tool or implement blade or head and to drive such stem or tang into a bore provided in the lower end of such wood handle and to reinforce the handle end having the bore by an enclosing ferrule. Commonly the end of the handle of such implements is bent toward the end of the handle having the bore which is enclosed by the ferrule to suitably position the head with respect to the straight portion of the handle which is manually grasped in the use of the implement. Because of the impracticability of telescoping a ferrule over the bend, such ferrules have heretofore had to be short, affording insufficient reinforcement for the handle, or are provided with an open longitudinally extending seam having obvious disadvantages in the manufacture, use, and appearance of the tool.

Other attempts to make implements with such ferrule enclosures have been objectionable for various reasons. Also in forming the bend on the end of the handle, irrespective of the construction of ferrule or socket which is to be used thereon, there is an inordinate amount of wastage of handles due to cracking and splitting of the handle by the methods and apparatus heretofore employed for bending them, and whereas in some cases the wood handle ends are steamed or immersed in hot water before the bending operation, subsequent shrinkage of the wood occurs, occasioning a loose fit of the handle end, with the enclosing ferrule with resultant weakening of the implement.

It is an object of my invention to provide a new method of making bent handles for tools.

It is also an object of my invention to provide an improved method of attaching tool handles and their ferrules together.

Another object of my invention is to provide a new method of simultaneously bending a tool handle and its ferrule together to form a permanent tight connection between the two.

Another object is to provide an improved construction of material handling implement having a wood handle bent adjacent the head of the implement and with the bend telescoped and enclosed in a rigid bent tubular ferrule or socket.

Another object is to provide an improved construction of material handling implement having a ferrule bent to conform to and enclosing a bend in the handle and continuing into a straight portion enclosing a straight portion of the handle beyond the bend.

Another object is to provide an improved method of bending wood handles by a bending mold in which a ferrule is utilized as a part of the mold.

Another object is to provide a joint construction for securing a wood handle to an implement head having improved characteristics of economy in manufacture.

Other objects will be apparent to those skilled in the art to which my invention appertains.

My invention is fully disclosed in the following description taken in connection with the accompanying drawings, in which:

Figs. 10 and 11 are, respectively, side elevational and bottom plan views of an implement of the shovel class formed with a handle socket and illustrating steps of process of providing the same with a bent socket and handle;

Figs. 12 and 13 are, respectively, side elevational and bottom plan views of an implement of the shovel class, generally similar to Figs. 10 and 11 but illustrating a modification;

Fig. 14 is a view similar to Fig. 4 illustrating a modification;

Fig. 15 is an elevational view partially diagrammatic of an electrically heated kiln in which the handle and ferrule are heated preparatory to bending, and Fig. 16 is a top plan view of the kiln of Fig. 15.

Figure 1:
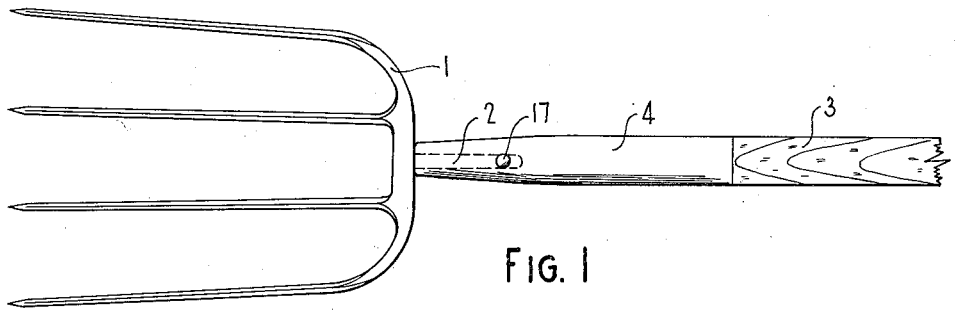
Fig. 1 is a plan view of a material handling implement of the fork type embodying my invention.
Figure 2:
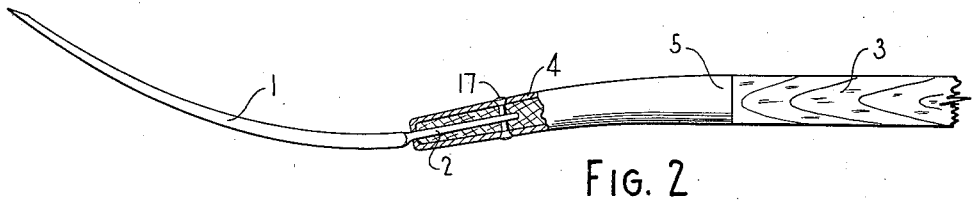
Fig. 2 is a side elevational view of the implement of Fig. 1.

Referring to the drawings, Figs. 1 and 2, which illustrate a material handling implement of the fork type which is an embodiment of my invention, I have shown at 1 the implement head in the form of a fork having a shank 2 extending therefrom, and driven into a bore in the end of a wood handle 3, and the end of the handle 3 adjacent the head 1 being enclosed in a tubular metal ferrule 4. Both the handle and ferrule are bent adjacent the head 1, and beyond the bent portion the ferrule is straight as shown at 5, conforming to the straight portion of the handle beyond the bend.

Figure 3:
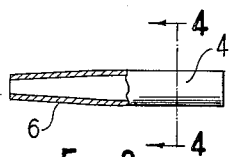
Fig. 3 is a view illustrating separately and in its original form a ferrule element illustrated in bent form in Figs. 1 and 2.
Figure 5:
Fig. 5 is a side elevational view illustrating separately a portion of the handle of the implement of Figs. 1 and 2 before it is bent as shown in those figures.
Figure 4:
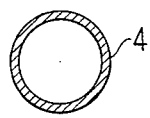
Fig. 4 is a cross-sectional view to an enlarged scale taken from the plane 4—4 of Fig. 3.

In constructing such an implement, the preferred procedure is as follows: The ferrule 4 is preferably formed from a straight metal tube; the ferrule then being swaged at one end to slightly taper it, as shown at 6, to give it the form shown in Fig. 3. While other cross-sectional forms of ferrule 4 may be employed, I prefer to make the ferrule circular in section as shown in Fig. 4 and formed from a cylindrical tube.

The handle 3 is in general formed by the usual wood-working processes and is made of thoroughly dried wood, and has on the end thereof a stem portion of reduced diameter 7, which in the implement under consideration is tapered at its outer end as at 8 and an axially extending shank-receiving bore 9 is formed in the end thereof. The stem 7 is formed to a size to insure a driving fit in the ferrule 4, the wood having been previously thoroughly dried as above stated.

Figure 6:
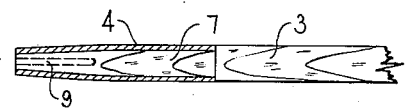
Fig. 6 is a view illustrating the handle and ferrule of Figs. 5 and 3 in assembled relation before being bent.

After the wood has been dried and the tapered stem portion 7 is driven into the ferrule 4, the parts appear as in Fig. 6.

The ferrule and the end of the handle located therein and forming the core thereof are now heated to a temperature sufficiently high to soften the natural resins in that portion of the handle within the ferrule and forming such core. Such a temperature preferably may range from about 300° F. to slightly less than the charring temperature of the wood. Any suitable means may be used for this heating of the ferrules and their wood core. For example, the ferruled ends of a number of handles may be inserted in the kiln of Fig. 15.

Referring to Figs. 15 and 16, the kiln generally indicated at 30, is illustrated. The kiln comprises a hollow drum rotatably supported on a base 31 by a post 32, the post being rotated in any suitable manner as by a worm gear 33 fixed to the post and driven by a motor actuated worm 34. A plurality of preferably concentrically disposed metal sockets 35 are mounted within the drum and are adapted to receive the ferrule and associated handle portion with the upper termination of the ferrule being substantially flush with the top 36 of the drum. Thus, the handle portion outwardly of the ferrule is subjected to relatively little heating action.

The drum illustrated is formed of metal and the inner walls thereof including the top and base are lined with suitable heat insulation 37 such as asbestos compounds although I contemplate that the drum material may be self-insulating.

The heating means generally indicated at 38 comprises a plurality of concentrically disposed coils of resistance wire connected in series and supplied with current from a power source 39 through slip rings 40—40 mounted on post 32.

As will be observed from Fig. 16, the coils are closely adjacent the sockets 35 and in a generally uniform arrangement insuring an even distribution of heat throughout the drum and to individual sockets.

The handles may be inserted within the sockets at one point in the path of rotation of the drum and removed at another point, the speed of the drum being regulated to insure a sufficient heating interval and sufficient time to insert and remove the handles.

Figure 7:
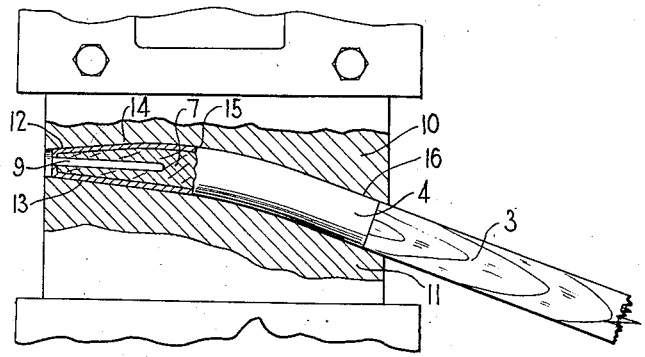
Fig. 7 is a view illustrating the handle and ferrule of Fig. 6 in a die apparatus illustrating the bending thereof.

After the ferrules and their handle cores have reached the proper temperature, the handles are removed and inserted between relatively vertically reciprocable die elements 10 and 11 (Fig. 7) having opposing concave recesses 12 and 13 substantially completely encircling the ferrule 4, and so formed that when the dies are relatively reciprocated in a relatively approaching direction to ultimately reach the positions shown in Fig. 7, they will bend the ferrule 4 and the shank portion 7 therewithin. The drawing Fig. 7, illustrates the die elements in their completely closed position and illustrates the final curvature of bend given to the ferrule and the stem portion therewithin.

Beginning at the outer end and for a distance substantially the length of the bore 9, there is only a very little curvature as at 14. Beyond this part and, as indicated at 15, the bend is relatively abrupt, and still further along the handle, as at 16, the curvature is discontinued and there is a portion substantially straight. While these are the preferred characteristics of the bend, it will, of course, be apparent that it may be varied as desired and to adapt it more suitably to different implements.

After removing the handles from the dies, they cool and the natural resins of the wood congeal to maintain the wood fibers in their altered relationship, occasioned by the bending. The handles may then be stored, to be later assembled with the fork or the like heads, or the heads may be immediately assembled therewith, or if preferred may be inserted before the bending operation previously described. In either case, the shank 2 of the head is driven into the bore 9, ordinarily with the convex side of the bend on the upper side of the head as shown in Fig. 2.

No further provision is necessary to retain the ferrule permanently on the handle or to prevent it rotating thereon, or to retain the handle stem, ferrule and head tang in proper longitudinal relation, this being accomplished by the curvature itself; but, if desired, the shank 2 may be additionally secured in the handle by a rivet 17, as shown in Figs. 1 and 2.

In forming a handle in this manner, the wood and the ferrule are molded to each other and the ferrule in effect becomes a part of the forming die during the forming process. Furthermore, since the wood within the ferrule is at all times under the compression of its drive fit in the ferrule, it is impossible for the wood to crack or split during the bending thereof so that wastage of handles by cracking and splitting during the bending operation thereof is avoided. In prior processes of bending handles, it has been necessary to hold the bent handle in a clamp or jig to keep the bend in the wood until it had set; but by the above-described process, all such apparatus and the storage for the handles during the setting process is rendered unnecessary, and the time consumed in forming the bend and attaching the ferrule by prior processes is enormously reduced.

While I prefer to employ a ferrule which is continuous in cross-section as illustrated in Fig. 4, my invention may be practiced with most of its advantages with a ferrule bent up from sheet metal, as shown in Fig. 14 with an open seam or juncture illustrated at 18, which is preferably permanently closed preferably by electrically welding the abutting edges of the seam together, as indicated at 23x.

Figure 8:
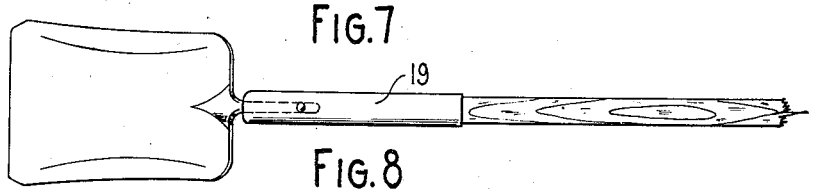
Figs. 8 and 9 are, respectively, top plan and side elevational views corresponding to Figs. 1 and 2 but illustrating an implement of the shovel class, and illustrating also a non-tapering ferrule.
Figure 9:
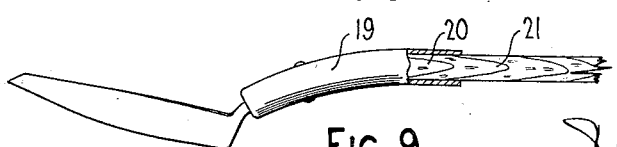

The stem portion 7 above described is usually of smaller diameter than the handle proper and is generally tapered in form. In some cases either or both of these characteristics may be omitted. In Figs. 8 and 9 is illustrated an implement of the shovel type and is molded on a stem portion 20 of a wood handle which is of the same diameter as the handle proper 21, the process employed being otherwise the same as that described above.

In Figs. 10 and 11 is illustrated the application of my invention to an implement of the type having a tubular handle socket 23 formed integrally with the blade 22. A previously dried handle 24 is driven into the socket 23 as illustrated in broken lines and then the socket and the handle therewithin are inserted within the heating sockets 35 in the manner illustrated in Fig. 15, which shows one form of apparatus for applying dry heat to the ferruled handles for predetermined periods, as previously described. The heated ferruled handle ends then are bent in dies such as those illustrated in Fig. 7, but formed in accordance with the desired form and size of the tubular portion 23, to take the form illustrated in solid lines in Fig. 10, the end of the handle or stem portion thereof and the socket surrounding it being molded to each other to the requisite curvature as above described.

In Figs. 12 and 13 is illustrated a modification of the implement of Figs. 10 and 11. In this form, a tubular socket 26 is butt-welded at 27 to a short opensided or hollow back socket 28, and the end of the handle is driven into the socket thus formed as shown in broken lines, Fig. 12; and is then bent as above described, the socket and the handle therewithin taking the form indicated in solid lines, this form of socket being preferred to that of Figs. 10 and 11 when the maximum of strength for the minimum weight of material is essential, the tubular socket 26 being obviously of greater strength for a given thickness of metal than the open-sided socket of Figs. 10 and 11.

In view of the complete description of the method and the article resulting therefrom given above in connection with the form of Figs. 1 and 2, it is believed that this brief description will be sufficient in connection with the form of Figs. 8 to 13 inclusive.

The practice of my invention is distinguished from methods employing green or steam or hot water treated woods in that reliance is mainly had upon the melting of the resins, within which term, I include all of the natural binding materials which normally maintain the wood fibers in their normal relationship to each other, in order to permit relative longitudinal displacement of adjacent fibers, while the binding materials are in their plastic state; and then the enclosing ferrule maintains the fibers in their relatively displaced positions during the subsequent cooling operation whereupon the binding materials again function to maintain the fibers in their new relatively longitudinally displaced positions, no softening of the fibers by their moisture content, being herein relied upon to permit the bending.

My improved method leaves the wood stems in their final form of the same diameters that they will have even after long continued use of the implement without any subsequent shrinkage and consequent loosening of the wood stems within the ferrules.

From the foregoing it will be apparent that my invention may be variously practiced and that changes and modifications may be made therein resulting in changes and modifications in the handles and implements above described, so that my invention is not limited to the exact details of process and implement herein described, but comprehends all such modifications and changes which come within the scope of the appended claim.

I claim:

The method of forming elongated wood handles for hand implements which includes tightly fitting a generally tubular metal ferrule onto an end portion of a previously thoroughly dried wood handle, simultaneously dry heating the ferrule and enclosed handle end portion to melt the natural wood fibre binding materials of the wood material thereof, then bending the metal ferrule and the wood contained therewithin simultaneously while the natural binding materials are still sufficiently heated as to still be at least plastically fluent, whereby longitudinal displacement of the fibres may occur without substantial fracturing thereof, and then permitting the wood and enclosing ferrule to cool while the bent enclosing ferrule maintains the wood material and fibres thereof in bent form in the longitudinally displaced relationship imposed upon them by the bending until said binding materials have solidified to cause said binding materials to maintain the wood fibres in their longitudinally displaced relationship occasioned by the bending of the wood handle end portion.

WARREN K. COWDERY.